May 27, 1924. Re. 15,846

H. F. FRENCH

ELECTRIC BATTERY

Original Filed July 27, 1915

Inventor

Harry F. French,

By Byrnes, Townsend & Brickenstein,

Attorneys

Reissued May 27, 1924. Re. 15,846

UNITED STATES PATENT OFFICE.

HARRY F. FRENCH, OF FREMONT, OHIO, ASSIGNOR, BY MESNE ASSIGNMENTS, TO NATIONAL CARBON COMPANY, INC., A CORPORATION OF NEW YORK.

ELECTRIC BATTERY.

Original No. 1,289,433, dated December 31, 1918, Serial No. 42,114, filed July 27, 1915. Application for reissue filed September 29, 1919. Serial No. 327,319.

*To all whom it may concern:*

Be it known that I, HARRY F. FRENCH, a citizen of the United States, residing at Fremont, in the county of Sandusky and State of Ohio, have invented a certain new and useful Improvement in Electric Batteries, of which the following is a specification.

My invention relates to electric batteries and more particularly to those in which the re-acting elements are kept separated until the batteries are to be put into action. Various types of such batteries have heretofore been devised, but most of them require the user to add a specified quantity of water, or other liquid, before they can be made active. Still another proposed type requires the user to heat the battery container to remove an insulating coating applied to the zinc throughout its entire surface. In all these types the user is required to perform some operation that is more or less objectionable, and such batteries have therefore found a very restricted sale.

Such a battery can be commercially successful only to the degree to which it possesses simplicity of manipulation in being rendered active, promptness of electrical response to such treatment, and capability of producing service which compares favorably with that given by other cells of equal size and suitable for use for similar purposes. These advantages are best attained in a cell which requires no diffusion of liquid within the cell preceding readiness for action, no addition of materials whatsoever, and which can be readily made active without the use of any tools or other instruments.

It is the object of my invention to construct batteries that fulfil these requirements. Broadly speaking, my invention consists in retaining a liquid or pasty material in an inactive position and arranging the structure of the cell in such a way that this material can be forced around the electrode into active position by a simple manipulation of certain parts of the cell itself.

The manner in which this result may be accomplished in regard to the so-called dry cell will now be described, reference also being had to the drawings, in which:—

In most cells of the so-called "No. 6" size the battery mix is tamped into a zinc can having a bibulous lining of pulpboard or similar material. In the smaller size of cells, such as is used in flashlights, the mix containing the electrolyte is molded around the central carbon electrode in a hard, compact form, and a bag wrapped around it to prevent it from contacting with the zinc can when it is placed therein. In this smaller type the molded "cartridge", as it is called, loosely fits the can so that there is room for a pasty material to be poured around the same. This pasty material contains water, flour and certain chemicals depending somewhat upon the make of the cell.

In the improved type of cell herein disclosed, it is preferable to use the molded cartridge type, comprising a carbon element 2 having a molded mix usually containing manganese dioxid and carbon, applied thereto, although the improvement is primarily intended for the No. 6 size or kind of battery.

Figure 1:
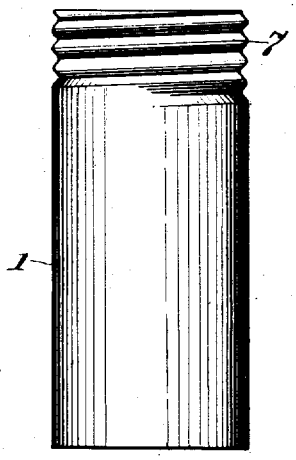
Figure 1 is a front view of the zinc container electrode.
Figure 2:
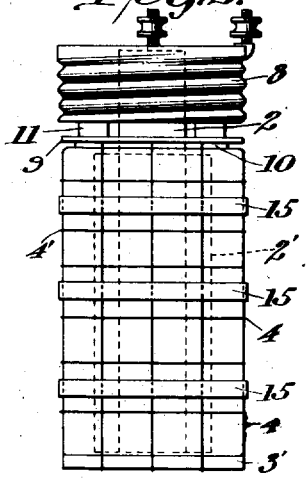
Figure 2 is a front view of the cartridge.
Figure 3:
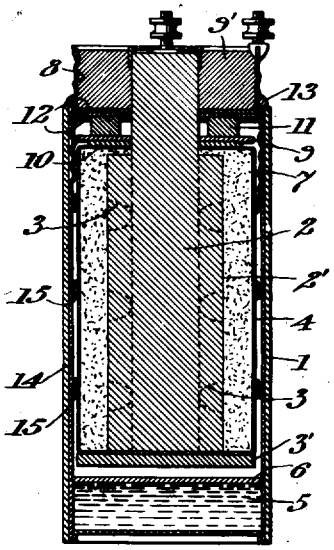
Figure 3 is a central cross sectional view of the battery when in the inactive position.
Figure 4:
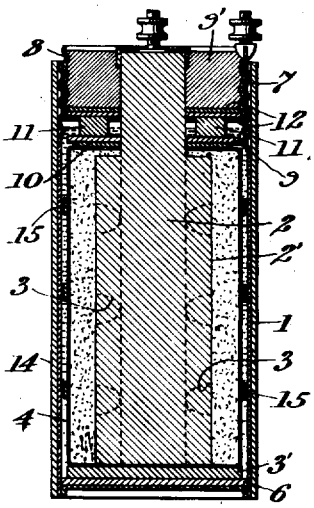
Figure 4 is a central cross sectional view of the battery when in the active position.

Referring to the drawings, 1 represents a cylindrical zinc container which constitutes one electrode of the dry cell. The cartridge to be inserted in the container is clearly shown in Fig. 2 and the same consists of a central carbon electrode 2 which is preferably fluted to increase the conductivity and to assist in holding the electrode in the molded mix. To further assist in holding these parts together, certain of the ridges 2′ of the electrode may be notched at 3, as shown in Figs. 3 and 4. The molded cartridge is wrapped in cloth 4, such as cheese-cloth, and after adding carboard disks 10 and 3′ at the top and bottom the whole is bound securely by cords 4′ as is customary in cells of such construction.

Instead of assembling this molded cartridge in a zinc can in the usual way, a pasty or liquid material 5 hereinafter for convenience referred to as "activating material" is first poured into the can 1 and the same effectively sealed by pouring on top of it a layer 6 of ceresin or other suitable material. This pasty material preferably consists of flour and water with some preservative such as zinc chlorid to prevent it from fermenting and evolving gas. The seal 6 serves to prevent evaporation of moisture from the activating material 5, and to preserve the latter in its original state and consistence, it may also prevent the activating material, when of liquid or semi-liquid consistence, from flowing when the position of the battery is altered.

After having sealed off the paste in the bottom of the can, the cartridge is inserted therein and allowed to rest on top of the seal 6. The upper part of the can 1 having been previously threaded at 7, a short piece of zinc 8 similarly threaded to fit inside the can, is screwed partly into the open end thereof. A cardboard disk 9 is then fitted on top of the small disk 10 and on top of this are placed several spacing blocks 11 made preferably of wood, though other inactive material of course could be used. On top of the blocks 11 is then placed one or more cardboard disks 12 which should snugly fit into the threads of the inner zinc 8. After having closed the bottom of the zinc ferrule 8 in this way, the usual seal 9′ of molten pitch, or asphaltum compound, is poured in on top to seal the cell to rigidly retain the carbon electrode therein. When this is done the ferrule 8 and attached cartridge may be screwed out slightly so there is no danger of pressure being prematurely applied on the seal 6 by accidental blows during shipment.

Although it is not imperative it is preferable to seal the zinc 8 where it emerges from the can 1, by applying thereto a bead of some soft wax 13, such as ceresin or paraffin, at the junction point of the two. The cell may then be inserted in the usual jacket 14. In this condition (shown in Fig. 3) the cell is inactive and may be stored indefinitely without substantial deterioration.

The active materials in the molded cartridge are prevented from attacking the zinc in the inoperative position, as there is but slight occasional contact and especially since there is not sufficient moisture in the cartridge to cause any considerable interaction. However, if it is desired to completely prevent any premature corrosion of the zinc can, rubber bands 15 may be placed around the cartridge at several places to effectually space the two apart.

When the user desires to put the cell in action it is only necessary to grasp the zinc ferrule 8, with its rigidly attached cartridge, and screw the latter down into the zinc can 1. As the cartridge is forced into the can, the seal 6 will give way around the edge and the liquid or pasty material 5 will be forced up around the cartridge to fill the space between it and the zinc container, and also more or less of the chamber between the disks 9 and 12. In case that the rubber bands 15 are used as spacers, there will still be sufficient clearance for the passage of the paste up around the cartridge.

After the cell has been put into its operative position, shown in Fig. 4, it acts in the same way as an ordinary dry cell. The paste or liquid next to the zinc permits the electrolyte which is in the battery cartridge to diffuse to the zinc and cause electrolytic action in the usual way. In case the paste or liquid already contains electrolyte in sufficient concentration the electrical response is of course more promptly obtained.

It will be apparent from the preceding description that my invention produces a practical cell that will keep indefinitely on "shelf" without deteriorating or in any way wasting its strength. The novel way of putting the cell into action is so simple that there will be no objection on the part of the user to performing this slight operation.

A preferable way to connect the container to the other parts of the battery is that previously described, on account of the threaded connection furnishing a more or less powerful means for forcing the paste up around the cartridge, but it will be apparent that there are many other equivalent ways of accomplishing the same purpose, specific mention of which need not be made.

The collar or ferrule 8 need not necessarily be attached to the cartridge while it is in the battery can, as part or all of this operation could obviously be carried out with the cartridge resting in a proper shaped form or dummy receptacle. Other variations in the procedure of making the cell are also permissible.

Having described my invention, what I claim is:—

1. In electric batteries, a container, a supply of material at one end of the container, an electrode suspended therein, a seal between said material and electrode, and means whereby the electrode can be moved farther into the container to force the material past said seal and up around the electrode.

2. In electric batteries, a tubular electrode, a supply of material at one end of the tubular electrode, a seal on top of said material, a second electrode suspended in said tubular electrode, and means whereby the second electrode can be moved against said seal to force said material up between the two electrodes.

3. In electric batteries, a container electrode, a supply of paste in the bottom of said container electrode, a carbon electrode having a cylinder of electrolyte mix secured thereto, and a metal ferrule around the upper end of the carbon electrode secured thereto by non-conducting material, said container electrode having means to engage the metal ferrule to suspend the electrode mix above the paste and out of contact therewith.

4. In electric batteries, a container electrode having screw threads on its open end, a supply of flour paste in the bottom of the container, a seal on top of said paste, a carbon electrode, a cylinder of electrolyte mix secured to the carbon electrode, and sealing material inside of the ferrule to secure the carbon electrode thereto, said ferrule being adapted to screw into the end of the container electrode.

5. A dry battery comprising a cartridge electrode, a zinc electrode surrounding the same and spaced therefrom, activating material supported out of contact with the cartridge electrode in the inactive position of the cell, and means for forcing said activating material into operative relation with the electrodes by manipulation of the cell parts.

6. In a dry battery, the combination of a two-part structure including a zinc electrode and comprising members capable of relative longitudinal adjustment, one of said members carrying a cartridge electrode comprising a carbon element having a molded mix applied thereto, the other member carrying activating material out of contact with said cartridge electrode, said members adapted by longitudinal adjustment to cause said activating material to combine operatively with the electrodes.

7. In a dry battery, the combination of a cartridge electrode comprising a carbon element having a molded mix applied thereto, a zinc electrode, one of said electrodes being normally supported upon the other but electrically insulated therefrom, activating material carried by one of said electrodes in a substantially inactive condition, and means for causing said activating material to combine operatively with the electrodes by the act of forcing one electrode past its point of normal support upon the other.

8. In a dry battery, the combination of a cartridge electrode comprising a carbon element having a molded mix applied thereto, a zinc electrode encircling said cartridge electrode, said cartridge electrode being normally supported upon the zinc electrode but electrically insulated therefrom, activating material carried by said zinc electrode out of contact with the cartridge electrode, and means for causing said activating material to combine operatively with the electrodes by the act of forcing the cartridge electrode past its point of normal support upon the zinc electrodes.

9. In a dry cell of the type where the electrolyte is kept out of operative position until it is desired to put the cell into use, a container, a bobbin consisting of a carbon electrode and a depolarizing mass, and a tubular element surrounding the bobbin and connected thereto.

10. In a cell, in combination, a container, a sealed mass of activating material therein, an electrode element longitudinally movable within the container, said electrode element, upon being pressed down within the container, being adapted to break the seal and displace the activating material and force the material upwardly rendering the cell active.

11. In a cell, a negative electrode, a positive electrode, a mass of activating material carried by one electrode but out of contact with the other electrode, said electrodes being adjustable relatively to each other to thereby displace the mass of activating material and bring it into contact with both said electrodes to thereby render the cell active.

12. In a cell, a negative electrode forming a container, a mass of activating material therein, an electrode supported by the container and normally out of contact with the mass of activating material, said container and electrode being relatively adjustable to press the electrode against the activating material and displace the same upwardly into cooperative relation with both electrodes whereby the cell is rendered active.

13. In electric batteries, a container, activating material therein, electrodes movable relatively to each other, to displace the material and bring it into operative contact with the electrodes.

14. A battery cell having an outer electrode, a mass containing the entire electrolyte disposed at the bottom thereof, an inner bobbin comprising the other electrode and depolarizer, means for holding said bobbin and outer electrode in spaced relation to each other while permitting free movement of said mass longitudinally therebetween, and means adapted to permit said bobbin to be moved in a direct longitudinal direction within said outer electrode.

15. In a cell, in combination, a negative electrode element, a positive electrode element, a mass of activating material normally maintained out of contact with the said electrodes, one of said electrodes being relatively movable with regard to the mass of activating material, said electrode upon being pressed against the inactive mass of activating material being adapted to displace and distribute the activating material in cooperative relation with both said electrodes.

16. In a cell, in combination, a container, a sealed mass of activating material therein, an electrode element longitudinally movable within the container, said electrode element, upon being pressed down within the container, being adapted to break the seal and displace the activating material and force the material upwardly rendering the cell active.

17. In a dry battery, the combination of a two-part structure including a zinc electrode and comprising members capable of relative longitudinal adjustment, one of said members carrying a cartridge electrode comprising a carbon element having a molded mix applied thereto, the other member carrying activating material out of contact with said cartridge electrode, said members adapted by longitudinal adjustment to cause said activating material to combine operatively with the electrodes.

HARRY F. FRENCH.